Nov. 15, 1949 — O. E. ESVAL ET AL — 2,487,793

OBJECT CONTROLLING ELECTRIC MOTOR SYSTEM

Filed Dec. 18, 1946 — 3 Sheets-Sheet 1

INVENTOR
ORLAND E. ESVAL
PERCY HALPERT
BY Herbert A. Thompson
ATTORNEY

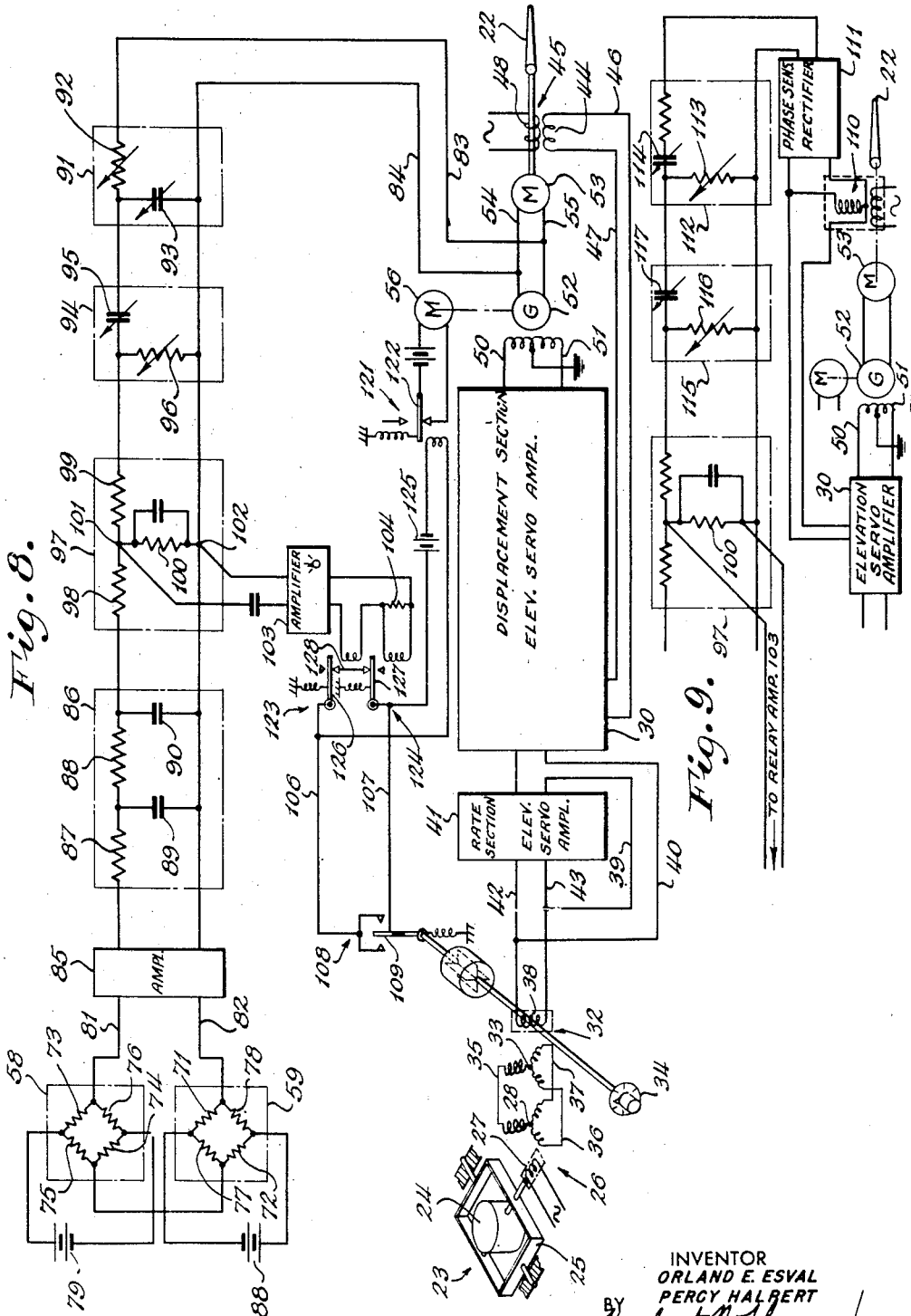

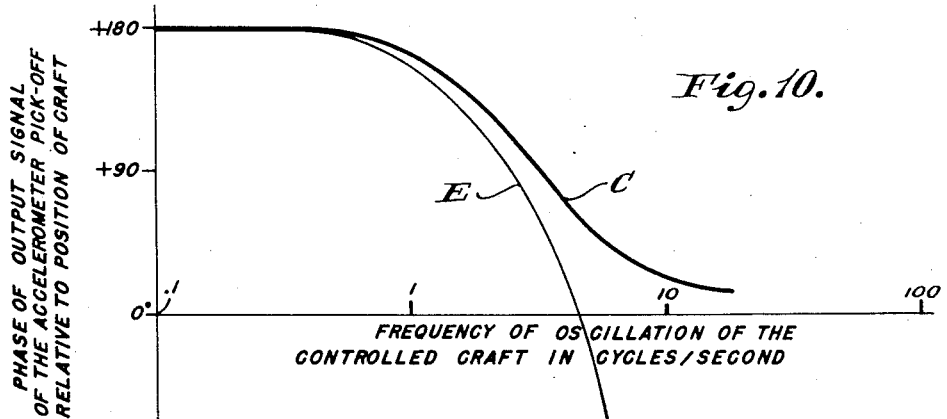
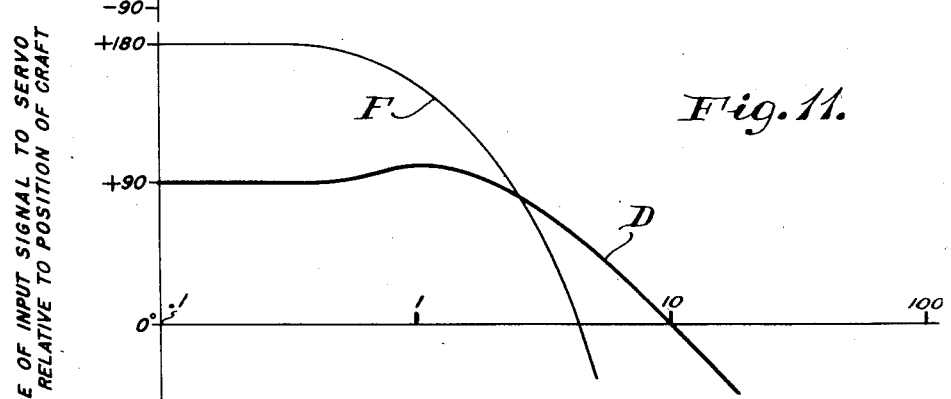
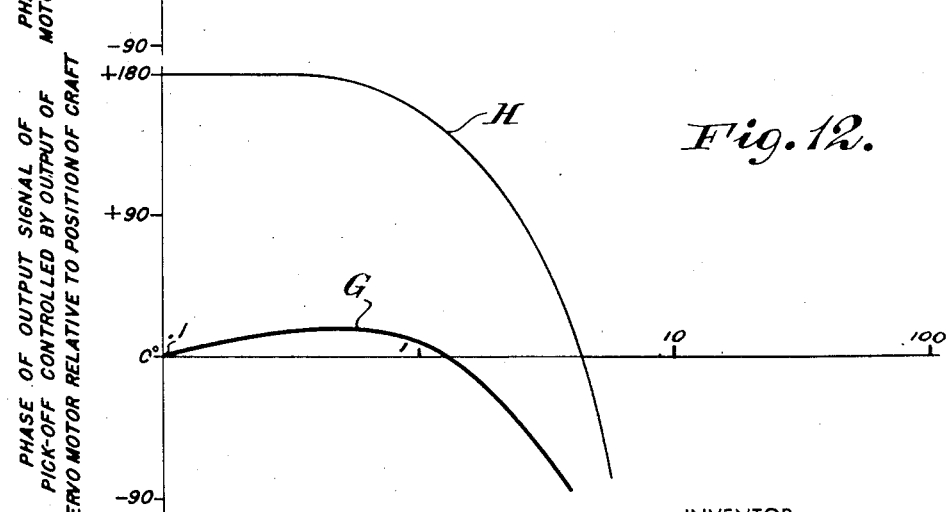

Patented Nov. 15, 1949

2,487,793

UNITED STATES PATENT OFFICE 2,487,793

OBJECT CONTROLLING ELECTRIC MOTOR SYSTEM

Orland E. Esval, Huntington, and Percy Halpert, Hempstead, N. Y., assignors to The Sperry Corporation, a corporation of Delaware Application December 18, 1946, Serial No. 716,974

22 Claims. (Cl. 318—489)

This invention relates to a control system for a device, body or dirigible craft that may be operated by means such as an automatic pilot. For purposes of description only, the invention is herein shown in connection with an automatic pilot that is connected to operate the elevator of an aircraft to control the movements of the craft about its pitch axis. Such a craft is subject to external disturbing forces such as rising or descending air currents that are also effective to move the craft about its pitch axis.

The monitory control of the present invention primarily provides a safety arrangement that is adapted to modify the operation of the input means or automatic pilot so that the same may be rendered ineffective when it persists in operating in an incorrect sense.

The improved monitory control is primarily provided for a device, object or craft capable of departing from a predetermined condition or position in two different senses. In essence, the invention provides input or control means for operating the device, object or craft that includes means for detecting or measuring departure from the predetermined condition or position. The input means normally operates to exert an action on the device, object or craft in a sense that restores the device, object or craft to the predetermined condition or position. The invention further includes a means providing an output in accordance with the actual sense of departure of the device, object or craft from the predetermined condition or position, and a means for modifying the action of the input means that may render the same ineffective when it is incorrectly effective or persists in operating in an incorrect sense. The modifying means of the invention compares the responses of the output providing means and the departure detecting means of said input means as to phase and amplitude and provides an output when the same are other than substantially equal and opposite. As herein shown, this output may render the input or operating means ineffective.

In aircraft, the monitory control of the present invention is concerned with the safety of the craft and its occupants in the event of malfunction of the input means or automatic pilot due to such causes as vacuum tube failure, a break in the system, mechanical trouble in the reference of gyro element of the automatic pilot or for other reasons. It will be understood that the automatic pilot is operating incorrectly when the input signal thereof is such as to cause the control surface or elevators of the craft to complement instead of oppose motion of the craft about an axis such as the pitch axis. With the automatic pilot operating correctly when the nose of the craft pitches down due to external disturbances, a signal is produced by the automatic pilot or input means that causes the elevator of the craft to move up. This causes the nose of the craft to rise again until the craft is levelled off or is restored to its predetermined reference condition or position. If the automatic pilot operated incorrectly due to any one of the hereinbefore noted causes, a signal may be produced that would cause the elevators either to move the craft in a sense or direction that adds to the original disturbance or to move the craft when such movement was undesired. In other words, with this condition in the example described, the elevator may be moved down to cause the nose of the craft to either pitch downwardly to a further extent or to initiate a downward pitching movement when the same was undesired.

The present invention is particularly directed to correct this condition by ascertaining when a persistent condition of this character exists and by modifying the action of the automatic pilot at such time so that the same may be rendered ineffective.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The features and structural details of the invention will be apparent from the following description when read in connection with the accompanying drawings, wherein;

Fig. 8 is a schematic view and wiring diagram illustrating the preferred embodiment of the invention;

Fig. 9 is a view similar to Fig. 8 illustrating a modified form of the invention, and Figs. 10, 11 and 12 are further curves that are used in connection with the description of the invention.

Figure 1:
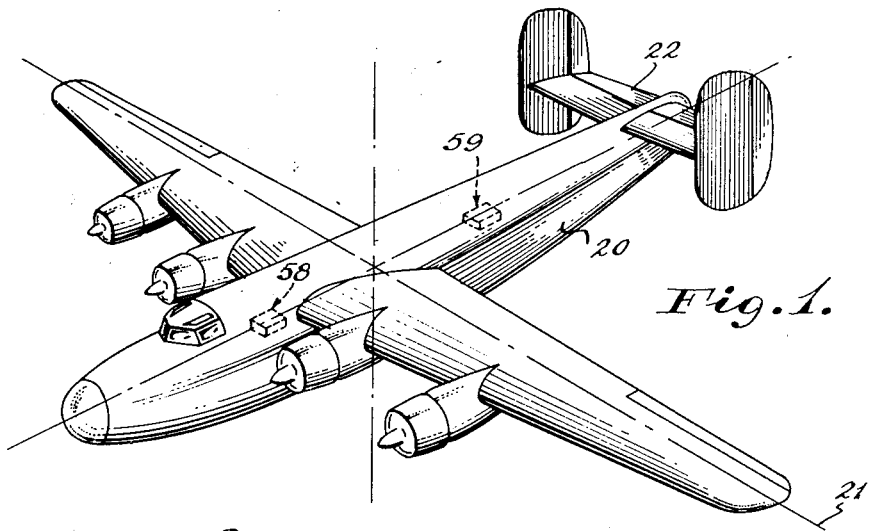
Fig. 1 is a perspective view of a movable object in the form of an aircraft in which the monitoring device of the present invention is incorporated.

As illustrative of a practical embodiment of the improved control system, the aircraft 20 in Fig. 1 provides an object or device that is operable about an axis, in this instance pitch axis 21, in one or the other of two different senses under control of the elevator 22 of the craft. The device, object or craft is capable of departing from a predetermined position or condition. One of the elements of the invention is a control means that is normally effective to detect such departure and to exert an action on the object, device or craft in a sense to restore the position or condition. Such means, in the present instance, is an automatic pilot that is effective to cause the elevator to move either up or down as required to restore the craft to a reference position or condition which may be a condition where the craft is flying level, that is, neither climbing nor gliding.

An illustrative automatic pilot in which the present invention is incorporated may include a gyro vertical indicated generally at 23 or other standard of position for the craft relative to its pitch axis. In this conventional type of instrument the spin axis of the rotor (not shown) in the rotor case 24 defines the standard of position. Rotor case 24 is universally mounted in a suitable casing by means of conventional gimbal ring 25. A Selsyn pickoff indicated at 26 has a rotor 27 that is energized by a suitable source of alternating current electrical energy. As shown, rotor 27 is situated at the pitch axis of the gyro vertical. The rotor 27 of the pickoff is positioned by the rotor case 24 of the gyro instrument. The stator 28 may be fixedly mounted on the ring 25. Such a pickoff produces an automatic pilot operating signal whose amplitude depends on the extent of the relative angular displacement of the craft about its pitch axis from the reference position and whose phase depends on the sense of the displacement from the reference position. When the craft is in the defined reference position the pickoff 26 provides a null output signal. When the automatic pilot is functioning correctly, the output of the pickoff 26 provides a control signal of proper sense to move the elevator upwardly to correct the craft for a nose-down condition. Likewise, in proper operation of the automatic pilot, the pickoff provides a control signal of proper sense to move the elevator downwardly to correct the craft for a tail-down condition.

As shown in Fig. 8, the signal of pickoff 26 is fed to the displacement section of an elevator servo amplifier 30 by way of a circuit that includes a manually movable means for controlling the operation of the automatic pilot. The manually movable means illustrated is a second Selsyn device 32 whose rotor 38 is positioned by moving a knob 34. The signal from pickoff 26 is fed to the stator 33 of device 32 by way of leads 35, 36 and 37. The rotor 38 of the device 32 is situated in the input circuit to the amplifier 30. As shown, the amplifier input circuit includes leads 39 and 40. A further input to amplifier 30 is obtained from rotor 38 by way of a rate section indicated at 41 through leads 42 and 43. A third source of input to amplifier 30 may be provided, as shown, from the stator 44 of a repeatback Selsyn device 45 by way of leads 46 and 47. The rotor 48 of device 45 is positioned in accordance with the position of the elevator 22 of the craft and is energized from a source of alternating current electrical energy as indicated. The output signal of device 45 consequently depends on the displacement of the elevator from a null position. The phase of this signal depends on the sense or direction of departure of the elevator from its null position.

The output of the amplifier 30 feeds a motor-generator set of the Ward-Leonard type by way of leads 50 and 51 which connect with the field circuit of a direct current generator 52. As shown, the armature circuit of the generator 52 energizes the armature of a servomotor 53 by way of leads 54 and 55. The field (not shown) of motor 53 is energized from a constant source. Generator 52 may be driven by a constant speed motor 56 that is energized from a constant source. As shown, the armature circuit of motor 56 may include a battery 120 and a relay 121 whose armature 122 is normally closed by means hereinafter described in detail. The automatic pilot may be rendered ineffective by opening the armature circuit of motor 56 through relay 121. Motor 53 is operatively connected to the elevator 22 by a suitable mechanical connection therebetween. Reference is made to the patent to Halpert, Frische, Bird and Esval, No. 2,462,095, dated February 22, 1949 for Electrical control systems, for a detailed showing of the elevator servo amplifiers that are indicated generally in boxes 30 and 41 of Fig. 8 in the drawing of the present application. The automatic pilot described to provide a background showing how the invention is adapted for practical usage is conventional except for the relay 121 in the armature circuit of the motor 56. The monitoring control of the present invention further includes a pair of relays 123 and 124 that are operable to control relay 121. The control circuit for relay 121 includes battery 125, and the respective armatures 126 and 127 for relays 123 and 124. In the normal positions, as shown, in which relay 121 is closed, relay 123 is closed and relay 124 is opened to complete the circuit by way of lead 128 which connects the series arranged armatures 126 and 127. It will be understood that the control circuit is opened when either relay 123 is opened or relay 124 is closed as hereinafter described in detail.

Figures 2, 3:
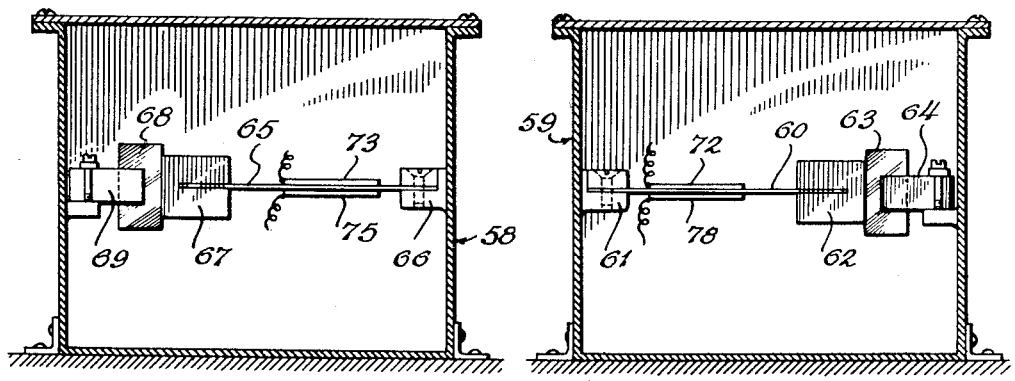
Figs. 2 and 3 are side elevation views of the fore and aft situated motion detecting units of the improved device.
Figure 4:
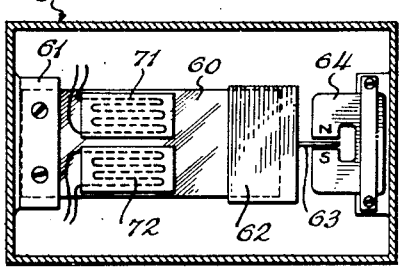
Fig. 4 is a plan view of the motion detecting unit shown in Fig. 3.

One of the primary elements of the invention is provided by a means for detecting the actual motion of the object, craft or device. This means may be considered the equivalent of a means responsive to departure of the craft, object or device from its predetermined condition or position. Such means is shown in Figs. 1 through 4 as a pair of accelerometers whose respective housings are indicated at 58 and 59. These instruments may be fixedly mounted in the craft at approximately equal radial distances from the axis 21 as indicated in Fig. 1. As shown in Figs. 3 and 4, the accelerometer 59 situated in the aft part of the craft may be composed of a leaf spring 60 that is fixedly mounted at one end thereof to the housing 59 as indicated at 61. The free end of the spring 60 may carry a weight 62 from which a vane 63 extends to move between the pole pieces of a magnet 64 that is fixedly mounted on the interior wall of the housing 59. Magnet 64 and vane 63 comprise a means for damping the movements of the end weighted spring 60. The housing 59 is mounted in the craft so that the spring 60 extends rearwardly in a substantially radial direction from the axis 21 with the fixed point of mounting of the spring nearest the axis 21. As shown in Fig. 2, the accelerometer in the fore part of the craft also includes a leaf spring 65, a mounting 66 at one end of the same to fix it in the housing 58, a weight 67 on the free end of the spring, a vane 68 and a magnet 69 fixedly mounted in the housing 58. The spring 65 in this instance extends forwardly in a radial direction from the axis 21 with the fixed point of mounting of the spring nearest the axis 21. With the use of the described twin arrangement for the accelerometers it is possible to cancel the effect of translational acceleration on the individual units so that the same detect angular acceleration about axis 21 only. When the nose of the craft 20 dips it will be understood that housing 58 moves correspondingly so that the weight 67 apparently rises to bend spring 65 upwardly. At the same time, housing 59 moves so that the weight 62 apparently dips to bend spring 60 downwardly. If the craft moved about axis 21 in the opposite sense, the response of the respective accelerometers would be opposite to that described.

Means are also provided for producing a signal in accordance with the sense of operation of the motion detecting means or accelerometer as the craft moves about its axis 21. As shown, such means may consist of a number of electrical pickoffs in the form of strain gauges of the character shown and described in U. S. Patent No. 2,334,843 of November 23, 1943, to A. C. Ruge that are arranged in a bridge circuit relationship on the upper and lower surfaces of the springs 60 and 65. These gauges take the form of resistors, two of which are indicated at 71 and 72 in Fig. 4. With reference to Fig. 2 and Fig. 8, the forward accelerometer unit is shown to include resistors 73 and 74 on the top of spring 65 and resistors 75 and 76 on the bottom of the spring. The bottom resistors for spring 60 are indicated at 77 and 78, in Figs. 3 and 8. Each bridge network 73, 76, 74, 75 and 71, 78, 72, 77 may be energized as shown from an independent source of electrical energy such as battery 79 and battery 80, respectively. The electrical bridges are connected in series in the showing in Fig. 8 and the output thereof appears as a voltage signal that is impressed across the bridge output leads 81 and 82.

In accordance with the present invention, the sense and magnitude of operation or action of the input operating means for the craft, object or device is compared with the sense and magnitude of operation of the motion detecting means to determine whether or not the input means is operating in the correct sense. If due to failure in the automatic pilot, the same persists in operating in an incorrect sense, the monitoring system herein disclosed is rendered effective to render the automatic pilot ineffective. The control is also effective in automatic pilots where the sense of operation of the automatic pilot is not such as to restore the craft to its reference position, i. e., cause the craft to move in a sense opposite to the sense of the external disturbance.

In order to compare the noted factors, means are provided for determining the sense of operation of the control means or automatic pilot which may take the form as shown in Fig. 8 of a circuit with leads 83 and 84 connected to the leads 54 and 55, respectively, of the input circuit to the armature of motor 53 of the automatic pilot. In this form of the invention, the signal of the circuit is compared with the signal of the strain gauge bridge type pickoff or signal producing means hereinbefore described. In order that the amplitude of the signals be such as to afford proper comparison, a conventional amplifier 85 is provided for the output of the strain gauges whose gain is adjustable as desired.

Figure 5:
Figs. 5, 6 and 7 are curves that are used in explaining the present inventive concepts.
Figure 6:
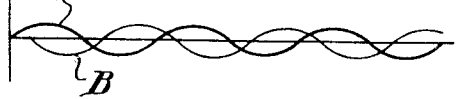
Figure 7:
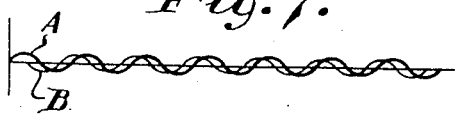

Referring to Figs. 5, 6 and 7, a number of curves are plotted to show the relation between the attitude of the craft in degrees about its pitch axis and the amplitude of the signal of the accelerometer with respect to time. The attitude curve is indicated at A and the accelerometer curve at B in each of these figures. As shown in Fig. 5 when the frequency of the change of attitude of the craft is very long, the curve of the accelerometer is 180° out of phase with the curve A. As the craft changes attitude at higher frequencies as indicated by Figs. 6 and 7, the curve B lags that of the attitude curve A further and further as the frequency increases. At an infinitely high frequency, the weights in the accelerometer stand still while the craft oscillates with respect to them so that the curve of the accelerometer is in phase with the change in attitude curve A.

Curves C and D in Figs. 10 and 11, respectively, have ordinates representative of the phase of the output signal of the accelerometer pickoff relative to the position of the craft and phase of the input signal to the servomotor 53 relative to the position of the craft and have a common abscissa representative of the frequency of oscillation of the craft in cycles per second. In order to compare these respective signals in proper phase relation, the amplified signal from the strain gauges is fed to a comparing means through a suitable integrating network indicated at 86 consisting of resistors 87, 88 and condensers 89, 90. By this treatment of the signal, curve C of Fig. 10 is smoothed out to appear as curve E with the named abscissa and ordinate values. In order to shape curve D so the signal of the input to the servomotor may be properly compared with that of the angular accelerometer, the same is fed to the comparing means by way of leads 83, 84 through an integrating network 91 consisting of variable resistor 92 and variable condenser 93 and a differentiating network 94 consisting of variable condenser 95 and variable resistor 96. The values of the elements of the networks 91 and 94 regulated for a given craft to change the shape of curve D in Fig. 11 to that of curve F which has substantially the same shape as curve E in Fig. 10.

As shown, the comparing means may consist of a network generally indicated at 97 having three resistors 98, 99 and 100. The signal from the angular accelerometer and the signal from the automatic pilot are compared in opposition across resistor 100 of the network so that normally these signals cancel and there is zero voltage across the points 101, 102 of the network. It will be understood that the automatic pilot is functioning correctly as long as the compared signals are substantially equal and opposite or balanced. With malfunction of the automatic pilot, a signal appears across points 101, 102 that is fed to a suitable amplifier 103 whose gain is adjustable to vary the sensitivity of the monitory control system before it is operable to render the automatic pilot ineffective. Relays 123 and 124 are in the output circuit of the amplifier 103 which circuit has a normal signal sufficient to close relay 123 with zero signal across points 101, 102. This signal due to the drop across resistor 104 in the output circuit of amplifier 103 is normally insufficient to close relay 124. Now if due to a signal across points 101, 102 the output signal of the amplifier 103 should drop, the relay 123 opens by action of its spring to open the monitor circuit. If the signal across points 101, 102 be such that the output signal of amplifier 103 should rise, the relay 124 closes against the action of its spring to open the monitor circuit. With monitor circuit open, it will be understood that relay 121 is opened and the armature circuit of motor 56 is opened in this instance to render the operating means or automatic pilot of the invention ineffective when the same persists in operating in an incorrect sense. The comparing means of the invention further provides an output when the input signals thereto are other than substantially equal and opposite that modifies the action of the control means and may render the control means entirely ineffective as herein provided.

As particularly applied to automatic pilots for aircraft, means are provided for by-passing the relays 123 and 124 when the craft is manually operated through the automatic pilot to, in this instance, either climb or glide to a different altitude. Such means is shown in Fig. 8 in the form of a normally open circuit in the monitor circuit that by-passes the relays 123, 124 including leads 106, 107 and switch 108 whose movable arm 109 is operatively connected to the manually movable knob 34. As shown, the knob 34 operates the switch 108 which is a spring centered, normally open type through a suitable viscous drag device.

The modification of the invention shown in Fig. 9 shows a different way of deriving the signal fed to the comparing means from the automatic pilot. In this instance, a pickoff 110 is used which is similar in construction to pickoff 45. The rotor of this pickoff is operatively connected to the output shaft of motor 53 and is energized from a suitable source of alternating current electrical energy. In the form of the invention in Fig. 8, this pickoff, there shown as pickoff 45 provides an elevator position repeatback signal that is fed to amplifier 30 in opposition to the signal of pickoff 26. In the present instance, the pickoff 110 provides two outputs, one of which is used as a repeatback signal and the other of which is used as one of the signal inputs to the comparing means 97. As shown in Fig. 12, curve G indicates the comparing means signal of pickoff 110 having the same ordinate and abscissa as the curves C and D of Figs. 10 and 11, respectively.

In order to properly utilize this signal in the comparing means 97, the same is first demodulated in a suitable phase sensitive rectifier as generally indicated at 111 and is then fed to the network 97 by way of a first differentiating network 112 composed of variable resistor 113 and variable condenser 114 and a second differentiating network 115 composed of variable resistor 116 and variable condenser 117. This treatment of the signal causes the same to have the slope of curve H in Fig. 12. No change is involved in the treatment of the signal from the accelerometer when the pickoff 110 provides the signal corresponding to the sense of operation of the automatic pilot. It will be noted that the curves H, E and F of Figs. 12, 10 and 11 have the same shape so that regardless of the frequency of the craft's oscillations about axis 21, the respective signals can be properly compared at the comparing means network 97.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A monitory control for a device having two different senses of operation away from a predetermined condition including in combination, normally effective reversible means for operating said device in a sense to restore the device to the predetermined condition, means for detecting the sense of operation of said operating means, means for detecting the actual sense of operation of said device, and means responsive to both said detecting means with persistent operation of said operating means in an incorrect sense for rendering said operating means ineffective.

2. A monitory control for a device having two different senses of operation away from a predetermined condition including in combination, normally effective reversible means for operating said device in a sense to restore the device to the predetermined condition, means for detecting the sense of operation of said operating means, means for detecting the actual sense of operation of said device, means for comparing said first and second detecting means to determine when the operating means operates in an incorrect sense, and means responsive to said comparing means with persistent incorrect operation of said restoring means for rendering said operating means ineffective.

3. A monitory control as claimed in claim 2, including means for varying the sensitivity of the means for rendering the operating means ineffective.

4. A monitory control for a device having two different senses of operation away from a predetermined condition including in combination, normally effective reversible means for operating said device in a sense to restore the device to the predetermined condition, means for detecting operation of said operating means, means for producing a signal in accordance with the sense of operation of said detecting means, means for detecting the actual sense of operation of said device, second means for producing a signal in accordance with the sense of operation of said second detecting means, means for comparing the signals of said first and second signal means as to phase and amplitude to determine when the operating means is operating incorrectly, and means operated by said comparing means with persistent incorrect operation of said operating means for modifying the operation thereof.

5. A monitory control as claimed in claim 4, in which the means operated by said comparing means is a relay that operates to modify the operation of said operating means by rendering the same ineffective.

6. In a control system, an object movable in two different senses from a predetermined position, reversible means for normally moving said object to restore the same to the predetermined position, means for detecting the actual sense of movement of said object from the predetermined position, and means for comparing the sense and amplitude of operation of said restoring means and the sense and amplitude of operation of said detecting means to determine when the restoring means is incorrectly effective.

7. In a control system, an object movable about an axis, means for moving said object in either a clockwise or counterclockwise direction about said axis, means for producing a signal in accordance with the sense of operation of said moving means, means for detecting the actual motion of said object about said axis, second means for producing a signal in accordance with the sense of operation of said detecting means, and means for comparing the signals of said first and second signal means to determine when the moving means is effective in an incorrect sense.

8. In a control system, an object capable of departure from a predetermined condition, control means normally effective to detect such departure and to exert an action on the object in a sense to restore the same to the predetermined condition, means responsive to the operation of said control means, separate means responsive to the actual departure of the object from the predetermined condition, and means for comparing said operation responsive means and said departure responsive means providing an output when the same are other than substantially balanced.

9. In a control system, an object capable of departure from a predetermined condition, control means normally effective to detect such departure and to exert an action on the object in a sense to restore the condition, means providing a signal in accordance with the sense of action of said control means, separate means providing a signal in accordance with the sense of departure of the object from the condition, and means for comparing the signals of said control signal providing means and said object signal providing means as to phase and amplitude providing an output when the same are other than substantially equal and opposite.

10. In a control system, a dirigible craft capable of movement from a predetermined position about an axis, an automatic pilot normally effective to detect such movement and to operate in a sense to restore the craft to the predetermined position, means responsive to the operation of said automatic pilot, separate means responsive to the movement of the craft from the predetermined position, and means for comparing said automatic pilot responsive means and said craft movement responsive means providing an output to determine when the automatic pilot is incorrectly effective.

11. In a control system, a dirigible craft capable of movement from a predetermined position about an axis, an automatic pilot normally effective to detect such movement and to operate in a sense to restore the craft to the predetermined position, means providing a signal in accordance with the sense of operation of said automatic pilot, separate means providing a signal in accordance with the sense of movement of the craft from the predetermined position, and means for comparing the signals of said automatic pilot providing means and said craft providing means as to phase and amplitude providing an output when the same are other than substantially equal and opposite.

12. The combination of an aircraft control surface movable about an axis to control the craft about a parallel axis, an automatic pilot operatively connected to said control surface normally effective to restore the craft to a reference position, means for detecting motion of the craft about its axis from the reference position, means for comparing the sense of operation of said automatic pilot and the sense of operation of said motion detecting means to determine when the automatic pilot is operating in an incorrect sense, and means operated by said comparing means for rendering said automatic pilot ineffective when the operation of the automatic pilot persists in an incorrect sense.

13. A monitory device for an aircraft automatic pilot including means for sensing the direction of operation of the automatic pilot, means for sensing the direction of movement of the craft about the axis thereof that the automatic pilot is effective, and means responsive to both said sensing means with persistent operation of said automatic pilot in an incorrect sense for modifying the operation of said automatic pilot.

14. A monitory device for an aircraft automatic pilot including means for sensing the direction of operation of the automatic pilot, means for sensing the direction of movement of the craft about the axis thereof that the automatic pilot is effective, means for comparing said first and second sensing means to determine when the automatic pilot is operating in an incorrect sense and means responsive to said comparing means with persistent incorrect operation of said automatic pilot for rendering said automatic pilot ineffective.

15. A monitory device as claimed in claim 14, including means for varying the sensitivity of the means for rendering said automatic pilot ineffective.

16. In an aircraft having a control surface for moving the same about an axis, an automatic pilot operatively connected to said surface, means for producing a signal in accordance with the sense of operation of said automatic pilot, means for detecting motion of the craft about said axis, means for producing a second signal in accordance with the sense of operation of said detecting means, means for comparing the signals of said first and second signal producing means to determine when the automatic pilot is effective in an incorrect sense, and means responsive to said comparing means for rendering said automatic pilot ineffective with persistent operation of said automatic pilot in an incorrect sense.

17. In an automatic pilot for aircraft, a monitory device having a normally closed relay, and means for opening said relay to render said automatic pilot ineffective including means for producing a signal in accordance with the sense of operation of the automatic pilot, means for sensing the movement of the craft about the axis thereof that the automatic pilot is effective, means for producing a second signal in accordance with the sense of operation of said sensing means, and means comparing the signals of said first and second producing means for causing said relay to open with persistent incorrect operation of said automatic pilot.

18. In an aircraft having a control surface for moving the same about an axis, an automatic pilot including motive means operatively connected to the surface and signal means for operating said motive means, means for detecting motion of the craft about said axis, a second signal means operable in accordance with the sense of operation of said detecting means, means for comparing the signals of said first and second signal means to determine when the craft is moving about said axis in the correct sense for the sense of operation of said automatic pilot, and means responsive to said comparing means for rendering said automatic pilot ineffective with persistent operation thereof in an incorrect sense.

19. In an aircraft having a control surface for moving the same about an axis, an automatic pilot including motive means operatively connected to the surface, a pickoff having a movable part operatively connected to said motive means to produce a signal in accordance with the sense of operation of the automatic pilot, means for detecting motion of the craft about said axis, a second pickoff producing a signal in accordance with the sense of operation of said detecting means, means for comparing the signals of said first and second pickoffs to determine when the craft is moving about said axis in the correct sense for the sense of operation of said automatic pilot, and means operated by said comparing means for rendering said automatic pilot ineffective with persistent operation thereof in an incorrect sense.

20. In an aircraft having a control surface for moving the same about an axis, an automatic pilot operatively connected to said surface, means for producing a signal in accordance with the sense of operation of said automatic pilot, an accelerometer responsive to motion of the craft about said axis, a pickoff producing a signal in accordance with the sense of operation of said accelerometer, means for comparing the signals of said signal means and pickoff to determine when the craft is moving about said axis in an incorrect sense for the sense of operation of said automatic pilot, and means operated by said comparing means for rendering said automatic pilot ineffective with persistent operation of the automatic pilot in an incorrect sense.

21. An automatic pilot as claimed in claim 20, in which said automatic pilot includes a motor operatively connected to the control surface, and said first signal producing means is a two part pickoff one of whose parts is connected to the output shaft of said motor.

22. In an automatic pilot for aircraft, a monitory device having a relay operable to render said automatic pilot ineffective, means for operating said relay, manually movable means for controlling the operation of the automatic pilot, and means operated by said movable means for bypassing said relay when the automatic pilot is manually controlled.

ORLAND E. ESVAL.
PERCY HALPERT.

REFERENCES CITED

The following references are of record in the file of this patent:

UNITED STATES PATENTS

| Number | Name | Date |
|---|---|---|
| 1,988,458 | Minorsky | Jan. 22, 1935 |
| 2,016,857 | Fischel | Oct. 8, 1935 |
| 2,115,498 | Rieper | Apr. 26, 1938 |